(12) United States Patent
Song et al.

(10) Patent No.: US 10,619,688 B2
(45) Date of Patent: Apr. 14, 2020

(54) DISC BRAKE FOR VEHICLE

(71) Applicant: MANDO CORPORATION, Pyeongtaek-si, Gyeonggi-do (KR)

(72) Inventors: Ki-Bae Song, Anyang-si (KR); Yun-Young Oh, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/928,530

(22) Filed: Mar. 22, 2018

(65) Prior Publication Data

US 2018/0274611 A1    Sep. 27, 2018

(30) Foreign Application Priority Data

Mar. 23, 2017 (KR) .................. 10-2017-0036562

(51) Int. Cl.
*F16D 65/097* (2006.01)
*F16D 65/18* (2006.01)
(Continued)

(52) U.S. Cl.
CPC .......... *F16D 65/0972* (2013.01); *B60T 1/065* (2013.01); *F16D 55/226* (2013.01);
(Continued)

(58) Field of Classification Search
CPC ............. F16D 65/0972; F16D 65/0977; F16D 65/0978; F16D 65/0979; F16D 65/0006
(Continued)

(56) References Cited

U.S. PATENT DOCUMENTS 5,025,897 A * 6/1991 Hirashita ............... F16D 55/226
188/250 B
5,649,610 A * 7/1997 Shimazaki .......... F16D 65/0972
188/73.36
(Continued)

FOREIGN PATENT DOCUMENTS

CN  105736604 A  7/2016
JP  H06-8347 Y2  3/1994
(Continued)

OTHER PUBLICATIONS

Office Action issued in Chinese Patent Application No. 201810243811.2 dated Jun. 21, 2019, with English translation.

*Primary Examiner* — Thomas W Irvin
(74) *Attorney, Agent, or Firm* — Morgan, Lewis & Bockius LLP

(57) ABSTRACT

Disclosed herein is a disc brake for vehicle. The disc brake for vehicle according to the embodiment includes a pair of friction pads disposed at both sides of a disc, a caliper housing and a piston configured to press the pair of the friction pads against the disc, and a moving guide configured to guide movement of the pair of the friction pads pressed against the disc by the caliper housing and the piston, wherein the moving guide may include a pair of guide arms disposed at both outer sides of the caliper housing and integrally connected by a steering knuckle of a vehicle, and the friction pad may be slidably supported by the guide arms using a pair of outward protrusions provided at both sides of the friction pad such that the friction pad extends between the pair of the guide arms and the caliper housing and further include a pad clip assembled with the outward protrusion to provide elastic support between the outward protrusion and the caliper housing.

10 Claims, 9 Drawing Sheets

(51) Int. Cl.
   *B60T 1/06* (2006.01)
   *F16D 55/226* (2006.01)
   *F16D 65/00* (2006.01)
   *F16D 55/00* (2006.01)
   *F16D 121/04* (2012.01)

(52) U.S. Cl.
   CPC ..... *F16D 65/0068* (2013.01); *F16D 65/0977* (2013.01); *F16D 65/0979* (2013.01); *F16D 65/18* (2013.01); *F16D 65/183* (2013.01); *F16D 2055/0016* (2013.01); *F16D 2121/04* (2013.01); *F16D 2200/0078* (2013.01)

(58) Field of Classification Search
   USPC ...................................... 188/73.38
   See application file for complete search history.

(56) References Cited

U.S. PATENT DOCUMENTS

| | | | | |
|---|---|---|---|---|
| 7,040,464 | B1* | 5/2006 | Andrews | F16D 65/0977 188/73.38 |
| 7,086,506 | B2* | 8/2006 | Wemple | F16D 65/0977 188/73.38 |
| 7,152,717 | B2* | 12/2006 | Lelievre | F16D 65/0006 188/73.38 |
| 7,438,160 | B2* | 10/2008 | Maehara | F16D 55/2262 188/73.31 |
| 9,341,220 | B2* | 5/2016 | Radhakrishnan ... | F16D 65/0006 |
| 9,388,868 | B2* | 7/2016 | Merrien | F16D 65/0006 |
| 9,388,869 | B2* | 7/2016 | Zhang | F16D 65/0972 |
| 2005/0236236 | A1* | 10/2005 | Farooq | F16D 65/0974 188/73.31 |
| 2014/0345984 | A1* | 11/2014 | Kamiya | F16D 65/0006 188/73.38 |
| 2015/0021127 | A1* | 1/2015 | Miura | F16D 65/0977 188/73.38 |
| 2015/0107944 | A1* | 4/2015 | Mallmann | F16D 65/0972 188/73.38 |
| 2016/0084329 | A1* | 3/2016 | Takeo | F16D 55/2265 188/73.38 |

FOREIGN PATENT DOCUMENTS

| | | |
|---|---|---|
| JP | H06-010240 Y2 | 3/1994 |
| KR | 1996-7002586 | 4/1996 |
| KR | 10-2002-0009664 A | 2/2002 |
| KR | 10-2003-0006156 A | 1/2003 |
| KR | 10-2013-0084031 A | 7/2013 |
| WO | 91/05179 A1 | 4/1991 |

* cited by examiner

DISC BRAKE FOR VEHICLE

CROSS-REFERENCE TO RELATED APPLICATION

This application claims the benefit of Korean Patent Application No. 2017-0036562, filed on Mar. 23, 2017 in the Korean Intellectual Property Office, the disclosure of which is incorporated herein by reference.

BACKGROUND

1. Field

Embodiments of the present disclosure relate to a disc brake for vehicle, and more particularly, to a disc brake for vehicle provided to reduce rattle noises caused by a friction pad coming into contact with a caliper housing.

2. Description of the Related Art

A disc brake for vehicle is an apparatus configured to brake a wheel using friction pads to press both sides of a disc rotating with the wheel.

Generally, a disc brake for vehicle includes a pair of friction pads disposed on both sides of a disc, a caliper housing and a piston configured to press the pair of friction pads against the disc, and a moving guide configured to guide the friction pad moved by being pressed against the disc by the caliper housing and the piston.

In addition, among some disc brakes for vehicle, there is a disc brake for vehicle including a pair of guide arms each integrally connected to a moving guide via a vehicle steering knuckle and disposed at both outer sides of a caliper housing, and a pair of outward protrusions extending between the pair of guide arms and the caliper housing and located at both of the sides such that a friction pad is slidably supported by the pair of guide arms.

However, such a disc brake for vehicle has a problem in that abnormal noises are generated while the caliper housing comes into contact with the outward protrusions of the friction pad caused by inertia of the caliper housing applied in a rotational direction of the disc during emergency braking of a vehicle.

RELATED DOCUMENT

Patent Document

Korean Patent Laid-Open No. 10-1996-7002586 (Apr. 27, 1996)

SUMMARY

Therefore, it is an aspect of the present disclosure to provide a disc brake for vehicle capable of reducing rattle noises caused by a caliper housing coming into contact with a friction pad during emergency braking.

Additional aspects of the disclosure will be set forth in part in the description which follows and, in part, will be obvious from the description, or may be learned by practice of the disclosure.

In accordance with one aspect of the present disclosure, a disc brake for vehicle includes a pair of friction pads disposed at both sides of a disc, a caliper housing and a piston configured to press the pair of friction pads against the disc, and a moving guide configured to guide movement of the pair of the friction pads pressed against the disc by the caliper housing and the piston, wherein the moving guide includes a pair of guide arms disposed at both outer sides of the caliper housing and integrally connected by a steering knuckle of a vehicle, and the friction pad is slidably supported by the guide arms using a pair of outward protrusions provided at both sides of the friction pad such that the friction pad extends between the pair of the guide arms and the caliper housing and further includes a pad clip assembled with the outward protrusion to provide elastic support between the outward protrusion and the caliper housing.

The pad clip may include: a support plate configured to support an outer surface of the outward protrusion; fixedly assembling parts configured to bend and extend from a plurality of positions of an edge of the support plate to cover and restrict a circumference of a side surface of the outward protrusion and fix the support plate to the outward protrusion; and a spring configured to bend and extend from the edge of the support plate and located between the fixedly assembling parts to provide elastic support between the support plate and the caliper housing.

The spring and the plurality of fixedly assembling parts may extend from the edge of the support plate in a pressing direction of the friction pad pressing the disc.

The spring may extend to be opened outward from the support plate in the pressing direction of the friction pad pressing the disc and include an assembly guide provided at one side of an end of the spring in a radial direction of the disc and configured to bend and extend toward an inside of the spring in a direction perpendicular to the support plate.

The spring may extend to be opened outward from the support plate in the pressing direction of the friction pad pressing the disc and include a sliding guide provided at an end of the spring in a extending direction of the spring and configured to bend and extend toward the inside of the support plate in a moving direction of the friction pad to guide sliding of the spring and the caliper housing.

The pad clip may be coated with Teflon to prevent corrosion.

The fixedly assembling part may be provided such that the friction pad is not interfered with by a support surface slidably supported by the moving guide.

In accordance with another aspect of the present disclosure, a pad clip includes a support plate configured to support an outer surface of the outward protrusion; and fixedly assembling parts configured to bend and extend from a plurality of positions of an edge of the support plate to cover and restrict a circumference of a side surface of an outward protrusion and fix the support plate to the outward protrusion, wherein the fixedly assembling part facing a sidewall of a caliper housing among the plurality of fixedly assembling parts is provided to provide elastic support between the support plate and the caliper housing.

The plurality of fixedly assembling parts may extend from the edge of the support plate in a pressing direction of a friction pad pressing a disc, the fixedly assembling part facing the sidewall of the caliper housing may extend to be opened outward from the support plate, and an assembly guide configured to bend and extend toward an inside of the support plate in a direction perpendicular to the fixedly assembling part may be provided at one side of an end of the fixedly assembling part facing the sidewall of the caliper housing.

A sliding guide provided to bend and extend toward the inside of the support plate in a moving direction of the friction pad to guide sliding of the caliper housing may be provided at an end of the fixedly assembling part facing the sidewall of the caliper housing in an extending direction of the fixedly assembling part.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
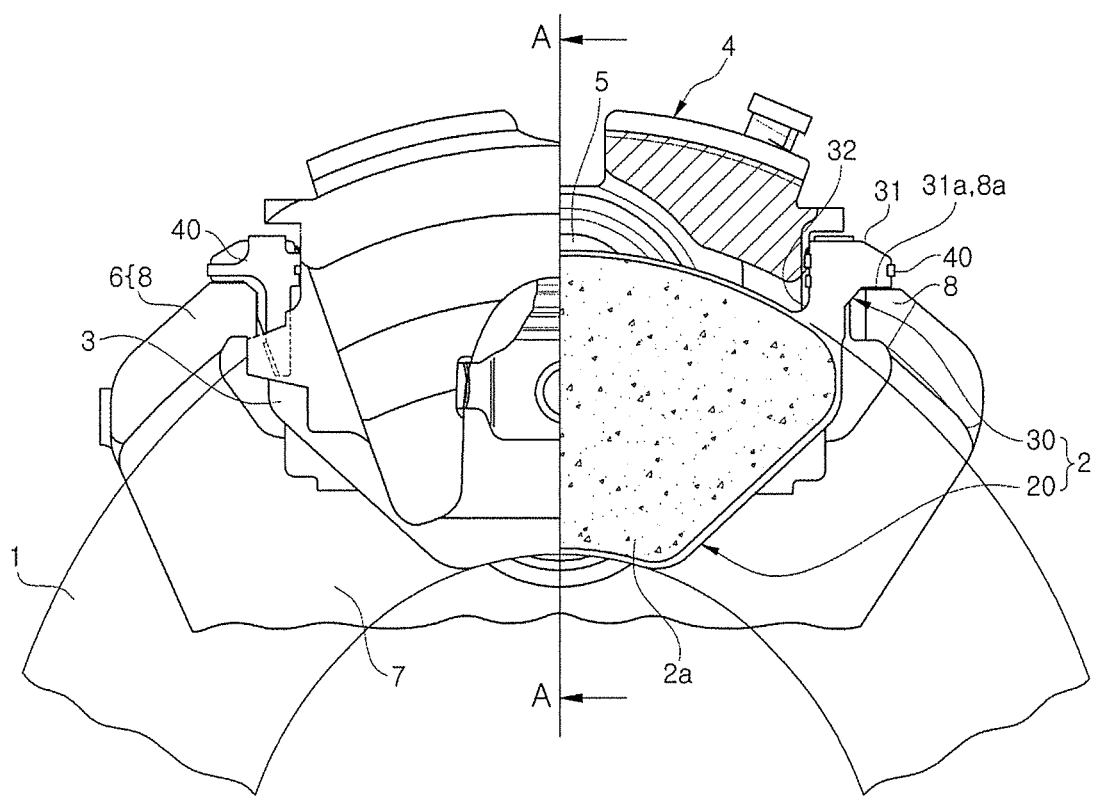
FIG. 1 is a side view illustrating a disc brake for vehicle according to one embodiment of the present disclosure, and a cross-sectional view shows a part of the disc brake for vehicle.

Hereinafter, embodiments of the present disclosure will be described in detail with reference to the accompanying drawings. The embodiments described below are provided as examples to fully convey the sprite of the present disclosure to those skilled in the art. The present disclosure are not limited to the embodiments described below and may also be implemented as other forms. Parts irrelevant to the description are omitted in the drawings in order to clearly explain the embodiments of the present disclosure, and widths, lengths, and thicknesses components illustrated in the accompanying drawings may be illustrated in an exaggerated way for the sake of convenience in the description. Components that are the same are referred to by the same reference numerals in the specification.

Figure 2:
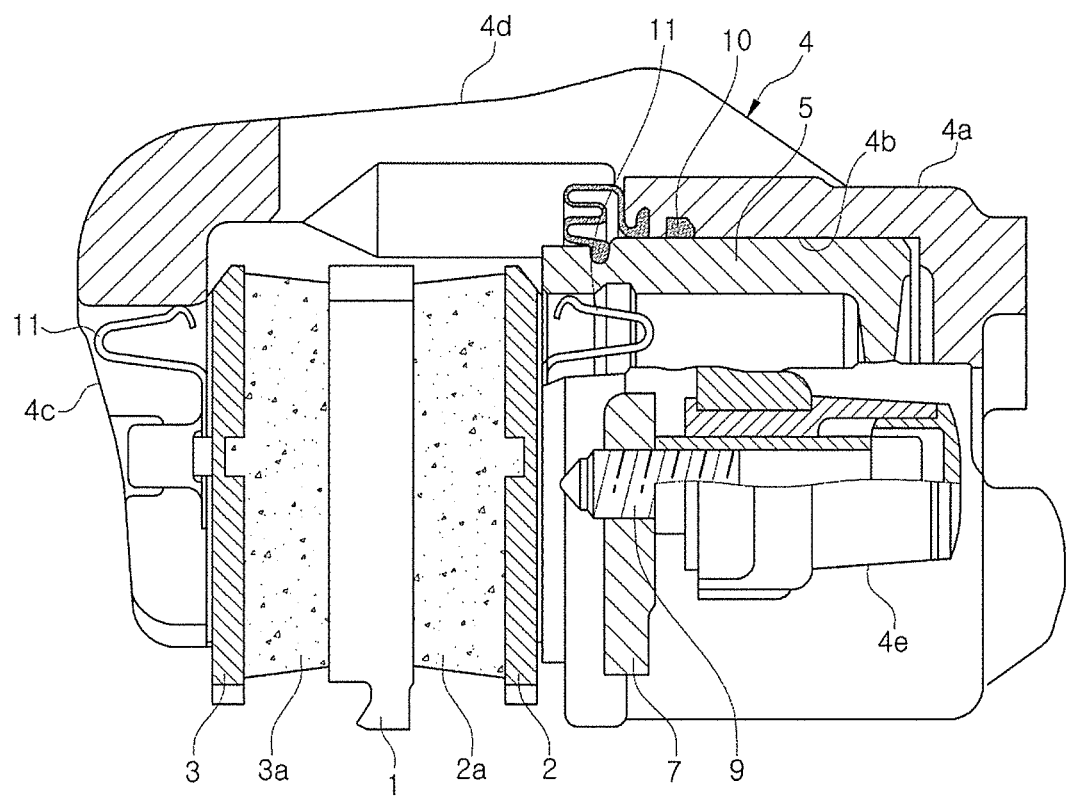
FIG. 2 is a cross-sectional view taken along line A-A and seen in an arrow direction in FIG. 1.

As illustrated in FIGS. 1 to 2, a disc brake for vehicle according to the embodiment includes a pair of friction pads 2 and 3 disposed at both sides of a disc 1 configured to rotate with a wheel, a caliper housing 4 and a piston 5 configured to press the pair of friction pads 2 and 3 against the disc 1, and a moving guide 6 configured to guide movement of the pair of friction pads 2 and 3 pressed against the disc 1 by the caliper housing 4 and the piston 5.

Friction members 2a and 3a may be respectively fixed to inner surfaces of the friction pads 2 and 3 facing the disc 1, and the pair of friction pads 2 and 3 may be divided into the inner friction pad 2 located at an inner side of the disc brake for vehicle and pressed against the disc 1 by the piston 5 and the outer friction pad 3 located at an outer side of the disc brake for vehicle opposite the inner side of the disc brake for vehicle.

The moving guide 6 includes a pair of guide arms 8 disposed at both outer sides of the caliper housing 4 and integrally connected via a steering knuckle 7 of a vehicle fixed to a vehicle body. The pair of guide arms 8 may extend from both sides of the steering knuckle 7 beyond the disc 1 to be parallel to an axis line of the disc 1.

The caliper housing 4 may include a cylinder 4a in which a bore 4b is formed such that the piston 5 configured to press the inner friction pad 2 against the disc 1 is installed to be movable forward and backward, a finger 4c configured to press the outer friction pad 3 against the disc 1, and a cover 4d configured to connect upper portions of the cylinder 4a and the finger 4c. The caliper housing 4 may be installed to cover the pair of friction pads 2 and 3 from an outer side of the disc 1 toward an inner side thereof in a radial direction of the disc 1.

Guide pins 9 may be coupled to the both sides of the steering knuckle 7 inside the guide arms 8, and sliding couplers 4e slidably coupled to the guide pins 9 may be provided at both sides of the cylinder 4a of the caliper housing 4. Accordingly, the caliper housing 4 may be installed between the pair of guide arms 8 to be slid in a direction perpendicular to the disc 1.

The piston 5 may be provided to perform a forward operation using a braking hydraulic pressure generated by a driver stepping on a brake pedal. Accordingly, a hydraulic pressure guide hole (not shown) for transmitting the braking hydraulic pressure generated during braking to the bore 4b may be provided in the cylinder 4a.

The piston 5 may be provided to be operated by a motor unlike that of the embodiment, and here, the motor configured to move the piston 5 forward and backward may be installed behind the piston 5 in a state in which the bore 4b and the hydraulic pressure guide hole (not shown) are removed.

A piston seal 10 may be installed between an outer surface of the piston 5 and an inner circumference of the bore 4b, and the piston seal 10 may return the piston 5, which is moved forward to press the inner friction pad 2, to an original state using a restoring force thereof.

In addition, pad springs 11 having a form of a leaf spring may provide elastic support between the inner friction pad 2 and the piston 5 and the outer friction pad 3 and the finger 4c.

Each of the friction pads 2 and 3 includes a body 20 pressed by the caliper housing 4 and the piston 5 and located at a center thereof and a pair of outward protrusions 30 provided at both sides thereof to extend between the pair of guide arms 8 and the caliper housing 4, and is slidably supported by the guide arms 8 using the pair of outward protrusions 30.

The outward protrusion 30 may include a sliding guide 31 disposed at a side of an upper portion of the body 20 to be disposed between the guide arm 8 and the cover 4d of the caliper housing 4, and a connector 32 configured to connect the body 20 and the sliding guide 31. Sliding support surfaces 31a and 8a slidably supported by each other may be respectively formed on a lower surface of the sliding guide 31 and an upper surface of the guide arm 8.

A braking operation and a brake releasing operation of the disc brake for vehicle having the above described structure will be described below.

First, when a driver steps on the brake pedal, the piston 5 presses the inner friction pad 2 against the disc 1 due to a braking hydraulic pressure applied to an inside of the bore 4b, and in this case, the caliper housing 4 slides along the guide pin 9 in a backward direction of the piston 5 due to a reaction force caused by the hydraulic pressure remaining at the bore 4b and presses the outer friction pad 3 against the disc 1 using the finger 4c. Accordingly, the disc 1 may be pressed between the friction members 2a and 3a respectively attached to the inner surfaces of the friction pads 2 and 3 located at both sides of the disc 1 and the vehicle may be braked.

In addition, when the driver releases the braking hydraulic pressure applied to the bore 4b by removing the foot from the brake pedal, the piston 5 returns to an original state due to a restoring force of the piston seal 10, and then, a frictional force between the disc 1 and the friction pads 2 and 3 located at the both sides of the disc 1 is reduced and a braking state of a wheel is released.

Meanwhile, pad clips 40 for providing elastic support between the outward protrusions 30 and the caliper housing 4 are assembled with the outward protrusions 30 of the friction pads 2 and 3. Since the pad clips 40 provide elastic support between the outward protrusions 30 protruding outward from the caliper housing 4 and the caliper housing 4 in a state in which the outward protrusions 30 are blocked from being in direct contact with the caliper housing 4, a contact noise between the caliper housing 4 and the outward protrusions 30 caused by inertia of the caliper housing 4 applied in a rotational direction of the disc 1 during emergency braking is prevented.

Since a moving direction of the caliper housing 4 due to the disc 1 in a case in which the vehicle moves forward is opposite a moving direction thereof in a case in which the vehicle moves backward and accordingly there is a risk in that the caliper housing 4 comes into contact with both of the outward protrusion 30 located in a forward direction and the outward protrusion 30 located in a backward direction according to the forward and backward directions of the vehicle during emergency braking, the pad clips 40 are preferably individually installed at the outward protrusions 30 of the both sides of the friction pads 2 and 3 to solve a contact problem between the caliper housing 4 and the outward protrusions 30 located at the both sides during emergency braking.

In addition, in a structure in which the pad clip 40 provides elastic support between the outward protrusion 30 and the caliper housing 4, since a state in which the sliding support surface 31a of the outward protrusion 30 is in stable contact with the sliding support surface 8a of the guide arm 8 is maintained, a noise due to sliding operations in which the friction pads 2 and 3 slide the guide arms 8 during braking may also be effectively reduced.

Figure 3:
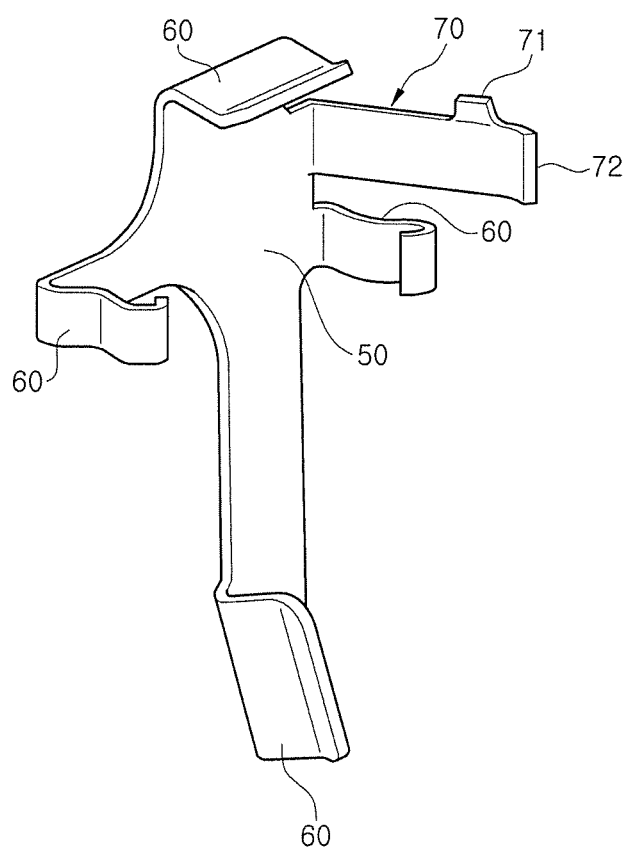
FIG. 3 is a perspective view illustrating a pad clip of the disc brake for vehicle according to one embodiment of the present disclosure.
Figure 4:
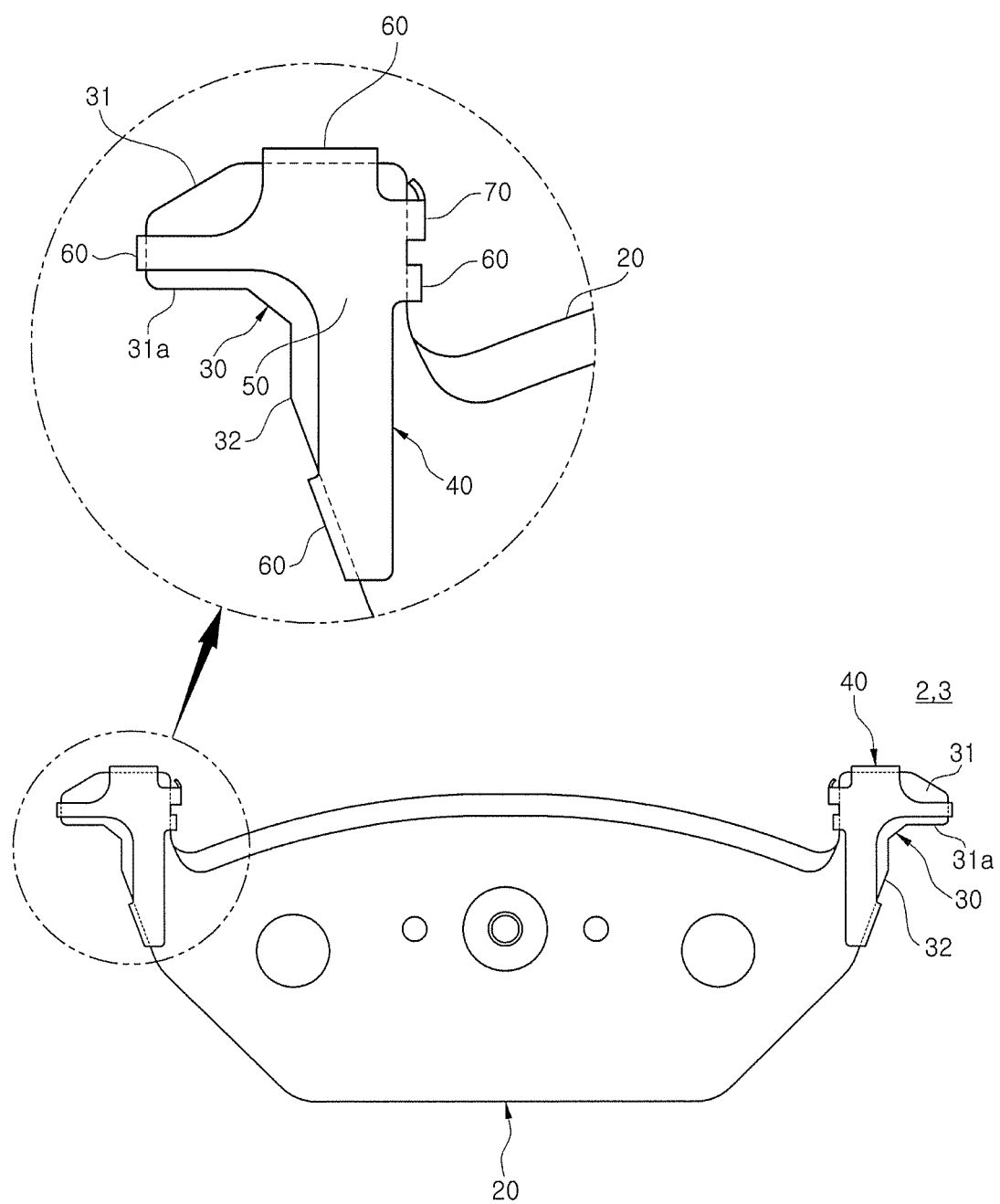
FIG. 4 is a rear view illustrating a friction pad of the disc brake for vehicle according to one embodiment of the present disclosure when a pair of pad clips of FIG. 3 are assembled.
Figure 5:
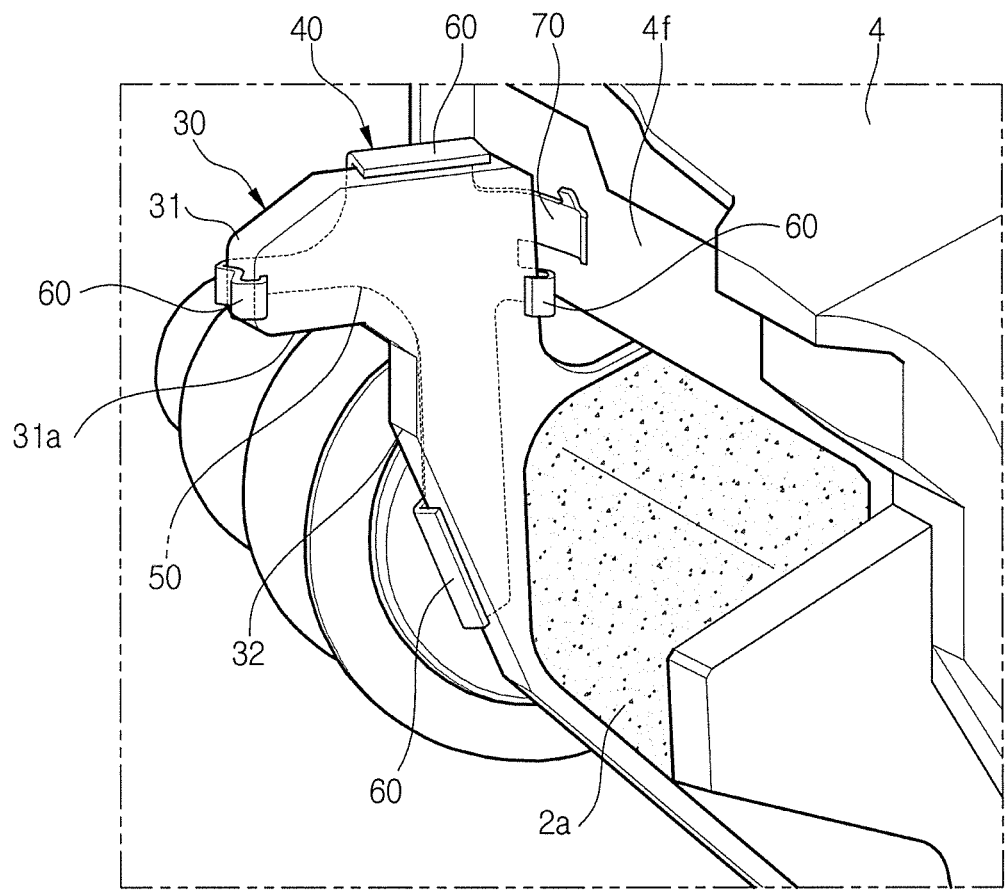
FIG. 5 is a perspective view illustrating a main portion at which the pad clip is assembled in the disc brake for vehicle according to one embodiment of the present disclosure.

As illustrated in FIGS. 3 to 5, the pad clip 40 may include a support plate 50 configured to support an outer surface of the outward protrusion 30, fixedly assembling parts 60 bending and extending from a plurality of positions of an edge of the support plate 50 and fix the support plate 50 to the outward protrusion 30 to cover and restrict a circumference of a side surface of the outward protrusion 30 and restrict the outward protrusion 30, and a spring 70 bending and extending from the edge of the support plate 50 and between the fixedly assembling parts 60 to provide elastic support between the support plate 50 and the caliper housing 4.

The pad clip 40 may be formed by cutting and bending one metal plate member, and the support plate 50, the fixedly assembling part 60, and the spring 70 included in the pad clip 40 may be integrally manufactured to be one body in a process of forming the pad clip 40.

The support plate 50 may be a main body of the pad clip 40 and provided in a plate shape having substantially the same shape and area as the outward protrusion 30 to be most of a support area of the pad clip 40 for the outward protrusion 30. Alternatively, the support plate 50 may also be provided to support a part of the outer surface of the outward protrusion 30 located at a side of the sliding guide 31. The outer surface of the outward protrusion 30 supported by the support plate 50 denotes an outer surface of the outward protrusion 30 located at an outer side of the friction pads 2 and 3 to which the friction members 2a and 3a are not attached.

The fixedly assembling parts 60 may be provided in hook shapes configured to cover a circumference of a side surface of the outward protrusion 30, and may fix the support plate 50 in a state in which the support plate 50 is supported by the outward protrusion 30 by a plurality of fixedly assembling parts 60 cooperating with each other and configured to restrict the outward protrusion 30.

Positions and the number of the fixedly assembling parts 60 may be variously changed within a range in which the fixedly assembling parts 60 restrict a plurality of positions on a circumference of the outward protrusion 30 other than a side of the sliding support surface 31a such that a sliding operation of the sliding guide 31 is not interfered with by the fixedly assembling parts 60. In addition, forms of the fixedly assembling parts 60 may be freely changed within a range in which the fixedly assembling parts 60 elastically cover the side surface of the outward protrusion 30.

The fixedly assembling parts 60 according to the embodiment are formed by four total parts and provided to restrict four positions on the circumference of the outward protrusion 30 which are consisted of three positions on a circumference of the sliding guide 31 and one position on a circumference of the connector 32.

The plurality of fixedly assembling parts 60 and the spring 70 of the pad clip 40 may be provided to extend from the edge of the support plate 50 in a pressing direction of each of the friction pads 2 and 3 configured to press the disc 1 in consideration of assemblability of the outward protrusion 30.

Since the pad clip 40 presses the support plate 50 against the outward protrusion 30 in a state in which ends of the fixedly assembling parts 60 are positioned at an outer side of the outer surface of the outward protrusion 30 to face the circumference of the outward protrusion 30, the plurality of fixedly assembling parts 60 elastically open toward an outside of the support plate 50, accordingly, the support plate 50 is supported by the outer surface of the outward protrusion 30, in this case, a state of the plurality of fixedly assembling parts 60 is changed into a state in which the plurality of fixedly assembling parts 60 restrict the circumference of the side surface of the outward protrusion 30, and thus the pad clip 40 may be simply assembled with the outward protrusion 30.

The pad clip 40 assembled with the outward protrusion 30 may serve as a leaf spring configured to provide elastic support between the outward protrusion 30 and an outer sidewall 4f of the caliper housing 4 using the spring 70.

Since the spring 70 obliquely extends from the edge of the support plate 50 in a pressing direction in which the friction pads 2 and 3 press the disc 1 to be opened outward from the support plate 50, the spring 70 may provide elastic support between each of the outward protrusions 30 spaced apart from each other and the caliper housing 4. As a reference, FIG. 5 is a view illustrating a state in which the outer friction pad 3 is removed.

An assembly guide 71 bending and extending toward an inside of support plate 50 in a direction perpendicular to the spring 70 may be provided at one side of an end portion of the spring 70 in a radial direction of the disc 1.

Figure 6:
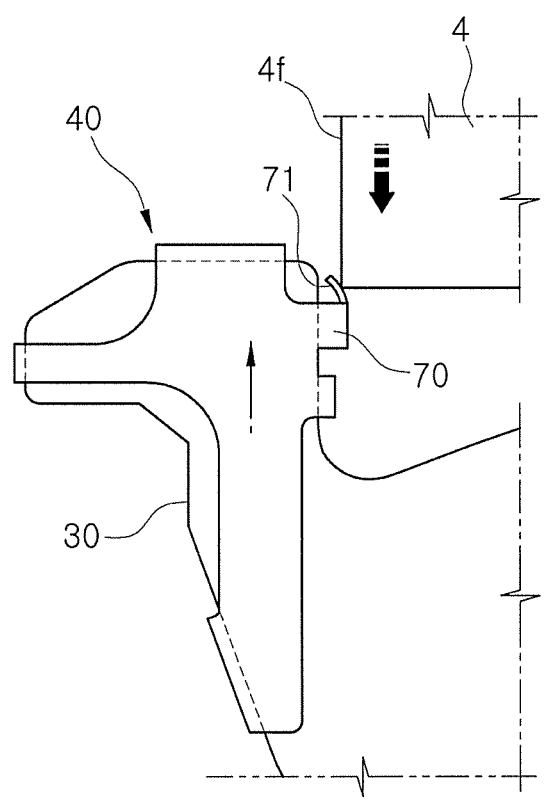
FIG. 6 is a view illustrating an assembly process of a caliper housing and the friction pad assembled with the pad clip in the disc brake for vehicle according to one embodiment of the present disclosure.

As illustrated in FIG. 6, the assembly guide 71 prevents the spring 70 from being damaged from being hooked or deformed by being pushed by the caliper housing 4 in a process in which the friction pads 2 and 3 and the caliper housing 4 are assembled such that the both sidewalls 4f of the caliper housing 4 are supported between the pair of outward protrusions 30 at which the pad clips 40 are assembled. An arrow of FIG. 6 denotes an assembly direction of the friction pads 2 and 3 and the caliper housing 4.

In addition, a sliding guide 72 bending and extending toward the inside of the support plate 50 in a moving direction of the friction pads 2 and 3 to guide the spring 70 to slide the caliper housing 4 may be provided at an end of the spring 70 in an extending direction thereof.

Figure 7:
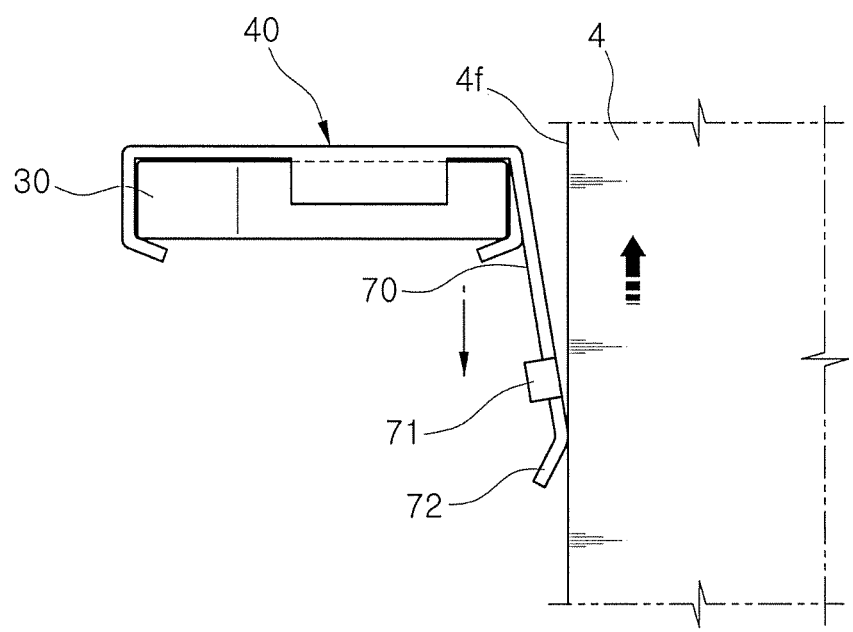
FIG. 7 is a view illustrating a sliding operation between the friction pad and the caliper housing during braking in the disc brake for vehicle according to one embodiment of the present disclosure.

As illustrated in FIG. 7, since the sliding guide 72 is provided to be gradually bent in a direction opposite an inclined direction of the support plate 50 to be opened outward from the support plate 50, a smooth sliding operation in which the spring 70 moves toward the disc 1 in a state in which the spring 70 is in contact with the sidewall 4f of the caliper housing 4 during braking may be guaranteed. An arrow of FIG. 7 denotes a sliding direction of the caliper housing 4 and the pad clip 40 during braking.

Figure 8:
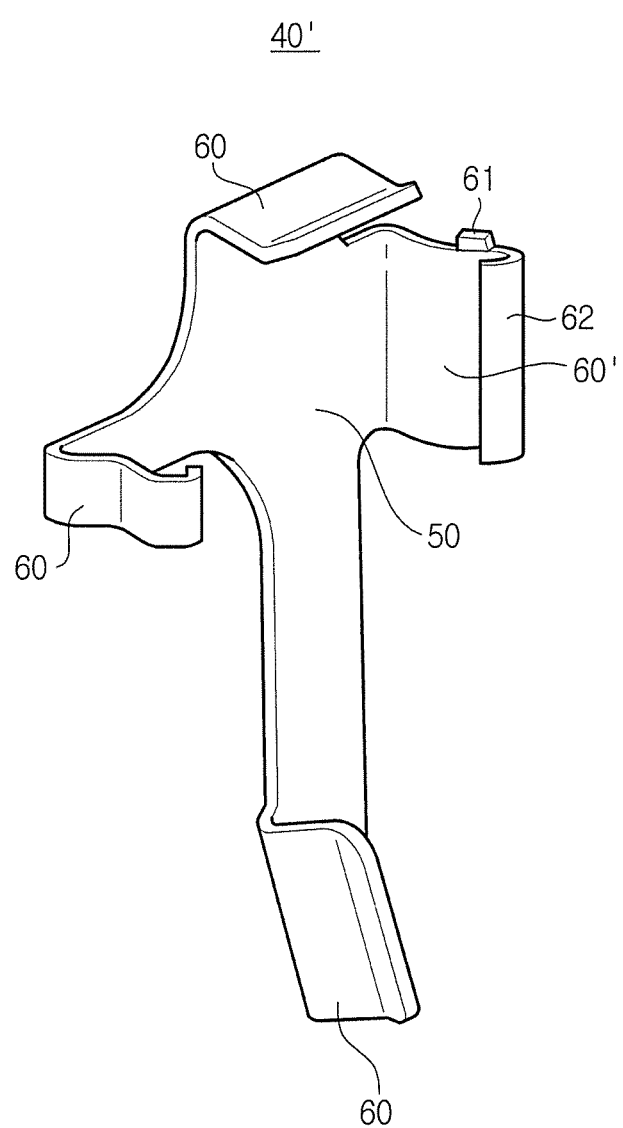
FIG. 8 is a perspective view illustrating a pad clip of a disc brake for vehicle according to another embodiment of the present disclosure.
Figure 9:
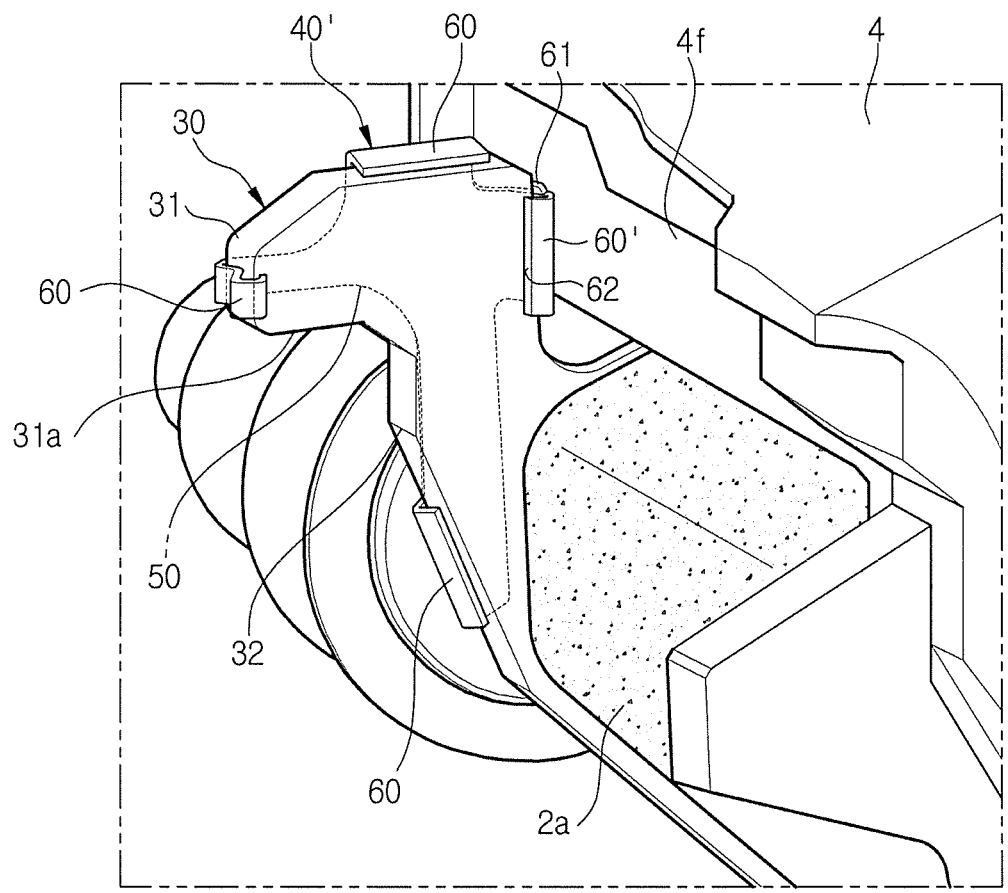
FIG. 9 is a perspective view illustrating a main portion at which the pad clip of the disc brake for vehicle according to another embodiment of the present disclosure is assembled.

Meanwhile, although it is illustrated and described in the drawings that the pad clip 40 includes four fixedly assembling parts 60 and one spring 70 and is installed at the outward protrusion 30 of each of the friction pads 2 and 3, the pad clip 40 is not limited thereto, and may be changed into various forms and used. For example, example of the pad clip 40' according to another embodiment of the present disclosure is illustrated in FIGS. 8 and 9. Here, the same reference numerals in the drawings as in the previous drawings refer to members that serve the same functions.

Referring to FIGS. 8 and 9, the pad clip 40' according to the embodiment may include a support plate 50 configured to support an outer surface of an outward protrusion 30, and fixedly assembling parts 60 and 60' bending and extending from a plurality of positions on an edge of the support plate 50, fix the support plate 50 to the outward protrusion 30 so as to cover and restrict a circumference of a side surface of the outward protrusion 30, and the fixedly assembling part 60', which faces a sidewall 4f of the caliper housing 4, among a plurality of fixedly assembling parts 60 and 60' may be provided to provide elastic support between the support plate 50 and the caliper housing 4. That is, the pad clip 40' according to the embodiment has a structure in which one fixedly assembling part 60 and the spring 70 of the pad clip 40 according to the previous embodiment are integrally formed as one body. Accordingly, the fixedly assembling part 60' facing the sidewall 4f of the caliper housing 4 extends to be opened outward from the support plate 50, and thus, the fixedly assembling part 60' may be provided to be supported by the sidewall 4f of the caliper housing 4 during assembly of friction pads 2 and 3.

In addition, like the previous embodiment, an assembly guide 61 and a sliding guide 62 may be provided at the fixedly assembling part 60' facing the sidewall 4f of the caliper housing 4 to prevent deformation of the pad clip 40' and smoothly assemble the pad clip 40' in a process in which each of the friction pads 2 and 3 at which the pad clip 40' is installed is installed in the caliper housing 4. That is, the assembly guide 61 bends and extends toward an inside of the support plate 50 in a direction perpendicular to the fixedly assembling part 60', and the sliding guide 62 is formed by an end portion of the fixedly assembling part 60' bending and extending toward the inside of the support plate 50.

The fixedly assembling parts 60 and 60' of the pad clip 40' may be variously changed within a range in which the fixedly assembling parts 60 and 60' restrict a plurality of positions on a circumference of the outward protrusion 30 other than a side of a sliding support surface 31a such that the fixedly assembling parts 60 and 60' do not interfere with a sliding operation of a sliding guide 31.

Meanwhile, the pad clips 40 and 40' according to the embodiments may be coated with Teflon to prevent corrosion of the pad clips 40 and 40' because of being assembled to be exposed to the outside.

As is apparent from the above description, a disc brake for vehicle according to the embodiment of the present disclosure can reduce rattle noises caused by a caliper housing coming into contact with a friction pad during emergency braking because a pad clip assembled with an outward protrusion of the friction pad provides elastic support between the caliper housing and the outward protrusion.

What is claimed is:

1. A disc brake for vehicle comprising:
   a pair of friction pads disposed at both sides of a disc;
   a caliper housing and a piston configured to press the pair of friction pads against the disc; and
   a moving guide configured to guide movement of the pair of friction pads pressed against the disc by the caliper housing and the piston,
   wherein the moving guide includes a pair of guide arms disposed at both outer sides of the caliper housing and integrally connected by a steering knuckle of a vehicle,
   wherein a friction pad of the pair of friction pads is slidably supported by a guide arm of the pair of guide arms using a pair of outward protrusions provided at both sides of the friction pad such that the friction pad extends between the pair of guide arms and the caliper housing and further includes a pad clip assembled with an outward protrusion of the pair of outward protrusions to provide elastic support between the outward protrusion and the caliper housing,
   wherein the pad clip is arranged such that at least a portion of the pad clip is in direct contact with an inner surface of the caliper housing during braking, and
   wherein the pad clip provides elastic support in a rotational direction of the disc between the outward protrusion and the caliper housing in a state in which the outward protrusion is blocked from being in direct contact with the caliper housing.

2. The disc brake for vehicle of claim 1, wherein the pad clip includes:
   a support plate configured to support an outer surface of the outward protrusion;
   fixedly assembling parts configured to bend and extend from a plurality of positions of an edge of the support plate to cover and restrict a circumference of a side surface of the outward protrusion and fix the support plate to the outward protrusion; and a spring configured to bend and extend from the edge of the support plate and located between the fixedly assembling parts to provide elastic support between the support plate and the caliper housing.

3. The disc brake for vehicle of claim 2, wherein the spring and the fixedly assembling parts extend from the edge of the support plate in a pressing direction of the friction pad pressing the disc.

4. The disc brake for vehicle of claim 2, wherein the spring extends to be opened outward from the support plate in a pressing direction of the friction pad pressing the disc, and includes an assembly guide provided at one side of an end of the spring in a radial direction of the disc and configured to bend and extend toward an inside of the spring in a direction perpendicular to the support plate.

5. The disc brake for vehicle of claim 2, wherein the spring extends to be opened outward from the support plate in a pressing direction of the friction pad pressing the disc, and includes a sliding guide disposed at an end of the spring in an extending direction of the spring and configured to bend and extend toward the inside of the support plate in a moving direction of the friction pad to guide sliding of the spring and the caliper housing.

6. The disc brake for vehicle of claim 2, wherein the fixedly assembling parts are provided such that the friction pad is not interfered with by a support surface slidably supported by the moving guide.

7. The disc brake for vehicle of claim 1, wherein the pad clip is coated with polytetrafluoroethene (PTFE) to prevent corrosion.

8. The disc brake for vehicle of claim 1, wherein the pad clip includes:

a support plate configured to support an outer surface of the outward protrusion; and fixedly assembling parts configured to bend and extend from a plurality of positions of an edge of the support plate to cover and restrict a circumference of a side surface of the outward protrusion and fix the support plate to the outward protrusion, wherein a first fixedly assembling part facing a sidewall of the caliper housing among the fixedly assembling parts is provided to provide elastic support between the support plate and the caliper housing.

9. The disc brake for vehicle of claim 8, wherein:

the fixedly assembling parts extend from the edge of the support plate in a pressing direction of the friction pad pressing the disc;

the first fixedly assembling part facing the sidewall of the caliper housing extends to be opened outward from the support plate; and an assembly guide configured to bend and extend toward an inside of the support plate in a direction perpendicular to the first fixedly assembling part is provided at one side of an end of the first fixedly assembling part facing the sidewall of the caliper housing.

10. The disc brake for vehicle of claim 9, wherein a sliding guide provided to bend and extend toward the inside of the support plate in a moving direction of the friction pad to guide sliding of the caliper housing is provided at an end of the first fixedly assembling part facing the sidewall of the caliper housing in an extending direction of the first fixedly assembling part.

* * * * *